(12) United States Patent
Honkala et al.

(10) Patent No.: US 7,590,407 B1
(45) Date of Patent: Sep. 15, 2009

(54) METHOD AND DEVICE FOR CARRYING OUT SECURITY PROCEDURES INVOLVING MOBILE STATIONS IN HYBRID CELLULAR TELECOMMUNICATION SYSTEMS

(75) Inventors: Hannu Honkala, Tampere (FI); Markku Rautiola, Tampere (FI); Tapio Siik, Espoo (FI); Petri Uosukainen, Tampere (FI); Kai Närvänen, Pirkkala (FI); Pekka Rissanen, Tampere (FI); Timo Hänninen, Tampere (FI); Roy Mickos, Tampere (FI)

(73) Assignee: Nokia Corporation, Espoo (FI)

( * ) Notice: Subject to any disclaimer, the term of this patent is extended or adjusted under 35 U.S.C. 154(b) by 250 days.

(21) Appl. No.: 10/130,406

(22) PCT Filed: Nov. 24, 2000

(86) PCT No.: PCT/FI00/01024

§ 371 (c)(1),
(2), (4) Date: Sep. 19, 2002

(87) PCT Pub. No.: WO01/39536

PCT Pub. Date: May 31, 2001

(30) Foreign Application Priority Data

Nov. 26, 1999 (FI) ................................. 19992530

(51) Int. Cl.
*H04W 24/00* (2006.01)
(52) U.S. Cl. ...................................... 455/410; 455/411
(58) Field of Classification Search .................. 455/410, 455/411, 461, 426.1, 414.1, 435.1, 445, 520, 455/552.1, 553.1, 560; 380/248, 328; 370/310, 370/328
See application file for complete search history.

(56) References Cited

U.S. PATENT DOCUMENTS 5,353,331 A * 10/1994 Emery et al. ................. 455/461

(Continued)

FOREIGN PATENT DOCUMENTS

| CN | 1196157 A | 10/1998 |
| JP | 09009349 A | 1/1997 |
| WO | WO 96/35309 | 11/1996 |
| WO | WO 97/23108 | 6/1997 |

(Continued)

OTHER PUBLICATIONS

"Race 2066 Functional Models of UMTS and Integration into Future Networks", by W. van den Broek et al., Jun. 1993, Electronics & Communication Engineering Journal, pp. 165-172.*
Office Action dated Apr. 22, 2005 in corresponding Japanese Application No. 2001-54055.

*Primary Examiner*—Jean A Gelin
(74) *Attorney, Agent, or Firm*—Foley & Lardner LLP

(57) ABSTRACT

A method (300) for carrying out a security procedure with a mobile station, where a hybrid cellular telecommunication system communicates with a mobile station (301) and the hybrid cellular telecommunication system communicates with a cellular network (308). The method is characterized in that the cellular network carries out the security procedure with the mobile station, the data related to the security procedure is transferred between the cellular network and the mobile station via the hybrid cellular telecommunication system, and the decision of triggering the security procedure of the cellular network is made outside the cellular network (309). The invention also relates to a network element (510) in the hybrid cellular telecommunication system that triggers the security procedure and to a network element (500) in the cellular network that carries out the security procedure after receiving a triggering signal.

33 Claims, 5 Drawing Sheets

U.S. PATENT DOCUMENTS

| | | | |
|---|---|---|---|
| 5,625,869 A | 4/1997 | Nagamatsu et al. | 455/33.1 |
| 5,887,256 A * | 3/1999 | Lu et al. | 455/426.1 |
| 6,212,395 B1 * | 4/2001 | Lu et al. | 455/463 |
| 6,421,339 B1 * | 7/2002 | Thomas | 370/352 |
| 6,539,237 B1 * | 3/2003 | Sayers et al. | 455/555 |
| 6,647,260 B2 * | 11/2003 | Dusse et al. | 455/419 |
| 6,687,356 B1 * | 2/2004 | Glitho et al. | 379/201.12 |

FOREIGN PATENT DOCUMENTS

| | | |
|---|---|---|
| WO | WO 99/48311 | 9/1999 |
| WO | WO 00/24139 | 4/2000 |

* cited by examiner

METHOD AND DEVICE FOR CARRYING OUT SECURITY PROCEDURES INVOLVING MOBILE STATIONS IN HYBRID CELLULAR TELECOMMUNICATION SYSTEMS

PRIORITY CLAIM

This is a national stage of PCT Application No. PCT/FI00/01024, filed on Nov. 24, 2000. Priority is claimed on that application and on application No. 19992530, filed in Finland on Nov. 26, 1999.

FIELD OF THE INVENTION

The invention relates in general to carrying out security procedures in telecommunication systems that combine cellular telecommunication networks with other networks. The invention relates in particular to security procedures which involve mobile stations.

BACKGROUND OF THE INVENTION

Traditionally separate networks have been used for transferring data and voice. Data is nowadays transferred mainly in packet based networks, especially in Internet Protocol (IP) networks. These networks can, for example, be simple local area networks (LANs) or complex interconnected corporate networks. Voice calls have traditionally been transmitted in circuit switched networks. In the recent years, however, there has been an explosive growth in real-time data applications that use packet based networks like the Internet as transport medium. These real-time applications can support voice and videocalls, and, for example, the IP-calls are expected to be less expensive than calls in traditional fixed or mobile networks.

The H.323 specification has been created by the International Telecommunications Union (ITU) for the purpose of defining a standard framework for audio, video and data communications over networks that do not provide a guaranteed quality of service (QoS). Packet based networks, for example, can be such networks. The aim of the H.323 specification is to allow multimedia products and applications from different manufacturers to interoperate. The H.323 specification defines functionality for call control, multimedia management, and bandwidth management as well as interfacing between networks. The H.323 specification defines four major components for a network-based communications system: terminals, gateways, gatekeepers, and multipoint control units. H.323 terminals, gateways and gatekeepers will be shortly described in the following. The multipoint control unit is needed for conference calls, where there are at least three participants.

A terminal is a client device in the network. It typically provides real-time, two-way communication for the user. All H.323 terminals must support voice communications, and they may also support video and data communications. A terminal can be realized using a personal computer, or the terminal may be a stand alone unit such as a conventional telephone. Further examples of terminals are Internet telephones, audio conferencing terminals, and video conferencing terminals. A gateway is used to connect a H.323 network to other types of networks and/or terminal types. A gateway may, for example, translate information transmission formats or protocols between the networks. A H.323 gateway, which may be distributed, can also participate in call setup and other procedures between the networks.

A gatekeeper functions as a controlling unit for a given section of an H.323 network, i.e. an H.323 zone. A gatekeeper provides call control services to registered endpoints, e.g., H.323 terminals or gateways. Further, a gatekeeper performs address translation between local area network aliases for terminals and gateways to IP or other network addresses. A gatekeeper may also perform bandwidth management, i.e., transmission resource control. Registration, address translation and bandwidth management employ Registration, Admission and Status (RAS) signaling.

The gatekeeper can also be used to route H.323 calls, in which case the calls are under control of the gatekeeper. This allows a simple way of providing many different kinds of services and traffic management features. While the concept of a gatekeeper is logically separate from the concept of a gateway or a multipoint control unit, the gatekeeper can be realized in the same physical device as a gateway or a multipoint control unit.

Usually calls that involve a mobile station are transferred at some point of the connection over fixed lines that are either part of the cellular network or part of the traditional Public Switched Telephone Network (PSTN). Systems that use other fixed networks, especially packet based networks, for transferring at least some of the mobile-originated or mobile-terminated calls have been recently developed. These systems are here called hybrid cellular telecommunication systems, and an example of them is the Rich Call Platform.

An example of a hybrid cellular communication system is illustrated in FIG. 1. The system 100 comprises cellular subsystems 101-104 which employ cellular techniques that support communications with a mobile station 140. Each of the cellular subsystem contains at least one base station or a corresponding network element, and as an example, FIG. 1 shows the base station 105 in the cellular subsystem 102. The rest of the system 100 may be implemented using other network techniques, for example IP networks and H.323 standard. The non-cellular part 110 of the hybrid cellular telecommunication system includes two local non-cellular subsystems 111 and 112, and a common non-cellular part 113 to which the non-cellular subsystems are connected via, for example, the Internet.

The local non-cellular subsystems 111 and 112 may be in two different premises of a company, and they are used to transmit calls and connections to the mobile stations via the cellular subsystems. The local non-cellular subsystems need to have an entity that routes the calls (corresponding to the H.323 gatekeeper) and a database where to store information about the terminals that are reachable via the cellular subsystems. In FIG. 1 these elements have been presented with local gatekeepers 115 and 117 and local databases 114 and 116. The cellular gateways 121-124 connect a cellular subsystem to a local non-cellular subsystem, and they are responsible for making, for example, necessary protocol transformations. The gateways are called here cellular gateways just to differentiate them from the other gateways possibly involved in hybrid cellular telecommunication systems.

When the cellular subsystems of a hybrid cellular telecommunication system cover, for example, all offices and buildings of a company, mobile calls from one office to another can be made using the non-cellular part of the system as fixed transmission media. The calls need not go through public cellular or fixed telephony networks, i.e. not through the public gateway 125. Especially if the company has offices around the world, this can result in considerable savings in telephony charges.

The hybrid cellular telecommunication system 100 is connected to the public cellular network 130 via the public gateway 125. The public cellular network 130 is typically owned, managed and maintained by a cellular network operator, whereas the cellular subsystems (in FIG. 1, for example, the cellular subsystems 101-104) may be operated, for example, by a cellular network operator or by the company in whose premises the cellular subsystems are.

Both calls and signaling information may be passed through the public gateway 125 Calls where the other endpoint is not within the hybrid cellular telecommunication system are routed through the public cellular network 130 in the example presented in FIG. 1. The common non-cellular part 113 to which the gateway 125 is connected, may be in the premises of the cellular network operator. Information about the mobile stations and subscribers that are allowed to use the hybrid cellular telecommunication system needs to be stored in the system, for example in a subscriber database 118.

In a sense, the hybrid cellular telecommunication system is an extension to the public cellular network 130. The hybrid cellular telecommunication system may rely on having access to certain service provided by the public cellular network 130. For example, necessary subscriber information may be fetched from the public cellular network. The public cellular network needs to be notified of the mobile stations that are reachable through the hybrid cellular telecommunication system. Otherwise it cannot, for example, route incoming calls correctly.

The Rich Call Platform (RCP), which combines parts and subsystems of a certain cellular system and fixed network techniques, is used here as a more tangible example of a hybrid cellular telecommunication system. FIG. 2 presents a schematic drawing of one RCP system 200, which employs Global System for Mobile Communications (GSM) as the cellular system and the combination of H.323 standard and IP network for transmitting part of the calls over fixed network. Part of the RCP system is within the corporate premises 220a. This part comprises a local area network 209a, where the calls and information related to the calls is presented in H.323 format, and at least one cellular subsystem. The LAN 209a is connected via an IP-based network 230 to another LAN 209b which is operated by the cellular network operator 220b and is usually situated in the premises of the cellular network operator. LANs 209a and 209b do not have to be situated in the same premises as long as both are connected to the same IP network 230.

Each of the cellular subsystems situated in the corporate premises 220a comprises one or more Base Transceiver Stations (BTS) 201 and a subsystem controller (SSC) 202 to which the base transceiver stations are connected. In RCP system, the subsystem controller is usually called IMC (Intranet Mobility Cluster). The SSC provides to the BTS same interfaces as BSC, but the actual fintionalities are typically distributed between different RCP entities. The SSC acts also as a gateway between the cellular subsystem which it controls and the H.323 part of the RCP system. The SSC 202 is connected to the local area network 209a of the office 220a.

A gatekeeper (WGK) 203 is a H.323 gatekeeper where some GSM features have been added. It is involved in signaling in the RCP system. It acts as a central point for all calls within its zone and provides call control and management services, such as network topology information, update of RCP subscriber information, address translation during call set-up, admission control and bandwidth control. In many ways gatekeeper acts as a virtual switch. Thus gatekeepers are sometimes called also Mobile Telephone Servers (MTS). Each RCP zone can be managed by one gatekeeper.

The cellular subsystem 210 and the non-cellular subsystem 211 of RCP system 200 are presented with dashed lines in FIG. 2. A part 203a of the gatekeeper 203 forms the cellular gateway of the RCP system 200 (corresponding, for example, to the cellular gateway 121 in FIG. 1).

Information about the presence of each mobile station and H.323 compatible terminals 205 in a RCP system is stored in an End Point Database (EPD) 204 which either is connected to the gatekeeper 203 or is a part of the gatekeeper. Using the information stored in the EPD 204 the gatekeeper 203 can determine, if the destination address of the call is within its control zone. This information is needed when setting up calls in the RCP system.

In the second LAN 209b, there are an A-interface Gateway (AGW) 206 and an Intranet Location Register (ILR) 207. The A-interface gateway 206 handles communications between the RCP system 200 and the public cellular network 130 via a A-ter-type interface 241. The A-ter interface is an interface normally found between Transcoder Submultiplexer (TCSM) and Base Station Controller in GSM-networks. Therefore the communications between the RCP system 200 and the public cellular network 130 can be handled like normal communications between Base Stations Subsystem and the public cellular network 130, the RCP-system 200 acting like a normal Base Station Subsystem from the view point of the public cellular network 130. The AGW is responsible for converting speech and data streams and signaling between the public cellular network and the H.323 part of the RCP system. If the RCP systems employs some other cellular network standard than GSM, the functionality of the AGW (or a corresponding gateway with a different name) is defined by the relevant cellular network standards.

The main function of a ILR database 207 is to store mobility management information of the subscribers using the RCP-system 200. For all subscribers that have a right to use the RCP system, there is a permanent entry in the ILR. The ILR contains both RCP-specific information, such as the IP address of the gatekeeper at whose control zone the mobile station currently is, and GSM-specific information, which is practically the same information as stored in the Visitor Location Register (VLR). The gatekeeper 203 is responsible for updating the RCP-specific information in the ILR, and the communications between ILR 207 and public cellular network 130 are handled via a MAP-interface 242. The MAP interface is a standard GSM-interface normally found between Home Location Register (HLR) and Mobile Services Switching Centre (MSC). Therefore the mobility management information from the RCP system 200 is handled from the view point of the cellular system 130 just like mobility management information of a normal GSM subscriber.

When a mobile station 140 is used in an office 220a where the RCP system 200 is present the call is received by a BTS 201, just as in normal cellular networks. The SSC 202 transforms the data which it receives from the mobile station 140 and which is carried by the uplink radio connection to IP packets according to the H.323 standard. It sends the packets further to the local area network 209a. Respectively, when data is transferred from the local area network 209a via the BTS 201 to the mobile station 140, the SSC 202 transforms received H.323 information to the suitable cellular network standard format understood by the BTS 201.

The gatekeeper 203 is responsible for the signaling involved in setting up a call. If the destination address is within the gatekeeper's control zone and the destination is H.323 terminal 205, then the connection is made directly with the H.323 terminal 205. If the destination is a mobile station 140 within the control zone of the gatekeeper 203, then the call is directed via the SSC 202 to the BTS 201 and further to the mobile station 140. If a call is made from the mobile station 140 to another RCP zone, the call is directed to the gatekeeper controlling the other RCP zone. If the destination is a mobile station, the two SSCs through which the mobile stations are reachable, are informed to establish the call.

When a call is made from the RCP system 200 to a destination that is a mobile phone reachable through the public cellular network 130 (either the mobile station owner being a RCP subscriber outside the RCP system coverage or being not at all a RCP subscriber), the gatekeeper 203 transfers the call via the packet switched network like Internet to the A-interface Gateway 206. As stated above the AGW 206 communicates with the public cellular network 130 through an A-ter interface 241. Therefore the public cellular network 130 handles the call like any normal mobile station call received by a MSC and connects the call using network specific methods and systems known per se.

If the call is made from a H.323 terminal 205 to a PSTN 232 or to a public cellular network 130, then the communication is handled by an ISDN Gateway (IGW) 208. The IGW 208 communicates with the public cellular network 130 via DSS.1 interface 243 thus looking form the point of view of the public cellular network 130 like a PBX (Private Branch exchange). This makes it possible for H.323 terminal 205 to communicate with other mobile stations than those within the RCP system using the public cellular network 130. The IGW also handles the communications between the RCP system 200 and the PSTN network 232, and this enables the H.323 terminals to communicate with the PSTN network 232. The calls made from a mobile station 140 to PSTN network 232 can be handled either via the AGW 206 using the systems in the public cellular network 130 to connect the call to the PSTN network 232 or the call can be connected to the PSTN network 232 using the IGW 208.

In the RCP system 200 calls between mobile stations use GSM speech coding. If a mobile originated call is routed through the public cellular network to a fixed phone, the public cellular network will take care of decoding the speech. If one endpoint of a call is a mobile station in the RCP system 200 and the other is H.323 terminal, there is maybe need for decoding and re-coding the speech between the GSM coding and coding methods defined in H.323 standard.

The encryption of the communications between BTS and mobile station in GSM system is part of the standard Air interface. As the RCP system 200 uses same standard interface for communications between the BTS 201 and the mobile station 140, the encryption is performed using same procedures as in a normal GSM system. The GSM procedures employ conventional secret key cryptography, where the secret key has to be known to both the encrypting party and the decrypting party. The GSM encryption key Kc is stored in the LR for those mobile stations that are within the RCP system. In GSM, the network decides when to authenticate a mobile station or when to generate new encryption keys. Generation and use of new encryption keys is necessary to make sure that the encryption is hard to break, i.e., to prevent eavesdropping. Too much information should not be encrypted with a single encryption key.

When calls are made outside RCP via the GSM network, the GSM network takes care of the necessary key generation and authentication procedures. A problem is that when calls are made within the RCP system the cellular network is not aware of them. Thus it cannot be responsible for the necessary generation procedures.

Authentication, on the other hand, validates the identity of the mobile station, or actually the identity of the SIM card in the mobile station. This enables, for example, the network to generate charging information related to a correct SIM identity. Further, access to certain services can be limited based on the identity of the user or SIM card. A further problem is that in certain situations the RCP system is not aware of the identity of a mobile stations using its resources. For example, if a handover is made from the GSM network to the RCP system, the necessary information about encryption keys is transmitted between the original BSC in the GSM network and the new SSC in the RCP system. Only information about the encryption key is transmitted, no information about the identity of the mobile station is received. Only after the mobile station sends a location update message to inform the system about its present location (to enable incoming calls to be routed to the right cell), the mobile station is authenticated by the cellular network and the identity of the mobile station is known both to the cellular network and to the RCP system.

Consequently, the RCP system or other hybrid cellular telecommunication system has to decide in certain situations itself when to authenticate the mobile station and when to change encryption keys. Without making changes to all mobile stations that are used in the hybrid cellular telecommunication system, the system cannot authenticate a mobile station or generate new encrypting key. The methods which the mobile station supports are in use solely in the cellular systems, and many of the procedures used are proprietary information of the cellular network operators.

It would be possible to design and construct a separate authentication and key management system for the hybrid telecommunication system, for example for the RCP system. The problem here is that such a system would require all the mobile stations to be used in the RCP system to have some special equipment where to store RCP-specific secret information and where to make calculations based on this information. Further, the secret information should be known only to the mobile station and, if conventional symmetric-key cryptography is used, to the RCP system. The SIM card could maybe be used for this, but it solves only half the problem. For each mobile station to be used in the RCP system, there should be a record in ILR, for example, stating either its secret key (conventional cryptography) or public key (public key cryptography). The construction and management of the system would be tedious, and an occasional visitor could not use the RCP system.

SUMMARY OF THE INVENTION

An object of the present invention is to provide a new method for offering security services in a hybrid cellular telecommunication system. The security services comprise authentication and generation and exchange of encryption keys. The method can be used even when a mobile station communicates only with terminals within the hybrid cellular telecommunication system.

A further object of the present invention is to provide a new arrangement for offering security services in a hybrid cellular telecommunication. This arrangement could be easily implemented to the existing network elements, thus economically resolving the above stated problems of the prior art.

A further object of the present invention is to provide new network elements comprising an arrangement for providing security in a hybrid cellular telecommunication system. Current network elements can be converted to the network elements according the invention with software modifications making the conversion easy and economically feasible.

These and further objects of the invention are achieved by letting the normal security procedures of a cellular network be triggered externally.

A method according the invention for carrying out a security procedure with a mobile station, where
- a hybrid cellular telecommunication system communicates with the mobile station, and
- the hybrid cellular telecommunication system communicates with a cellular network, is characterized by that which is specified in the characterising portion of an appended independent claim directed to such a method.

An element of a hybrid telecommunication system according to the invention is characterized by that which is specified in the characterising portion of an appended independent claim directed to such an element.

An element of cellular network according to the invention is characterised by that which is specified in the characterising portion of an appended independent claim directed to such an element.

In the method according to the invention, a mobile station is communicating with other terminals via a hybrid cellular telecommunication system. The hybrid cellular telecommunication system has means, i.e. at least one cellular subsystem, that enable the mobile phone to make calls or connections via the telecommunication system.

In the method according to the invention, when there is need to run a security procedure, the normal security procedures of a cellular network are triggered externally and the data or messages related to the security procedure are transferred between the cellular network and the mobile station via the hybrid cellular telecommunication system. When the cellular network receives a triggering request, it carries out the requested security procedures. Currently only the cellular network can decide, when to run the security procedures, so the implementation of the method requires some minor changes to some cellular network elements.

The security procedures comprise authentication and generation and exchange of encryption keys. In some cellular networks, for example in GSM, the same procedure is responsible for both these operations. But in cellular networks, where these procedures can be carried out independently, any of the procedures can be asked for.

The invention does not make a stand on how the decision about the need for security operations is made or who makes the decision. It may be, for example, the mobile station that requests for new encryption key. Or the hybrid cellular telecommunication system may decide there is a need to authenticate the mobile station, and it sends the triggering request to the cellular network.

If the hybrid cellular telecommunication system is unaware of the identity of the mobile station, it must first query the mobile station for some identity code and then ask the cellular network to authenticate that specific mobile station. Another option is that the hybrid cellular telecommunication system sends an original triggering request to the mobile station. This mobile station is modified so that it sends the authentication triggering request that contains its identity code after receiving the original triggering request. This second option requires modifications to the mobile stations so, if there is a way to ask the identity of the mobile station, the first option is more feasible.

The method according to the invention demands only minor modifications to the network elements in the hybrid cellular telecommunication systems or in the cellular networks, thus being economical and easy to implement. The security procedure initialization requests can be sent to the cellular network as often as needed. This enables the use of a hybrid cellular telecommunication system without jeopardising the level of security at the air interface.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will now be described more in detail with reference to the preferred embodiments by the way of example and to the accompanying drawings where.

DETAILED DESCRIPTION OF THE PRESENTLY PREFERRED EMBODIMENTS

Figure 1:
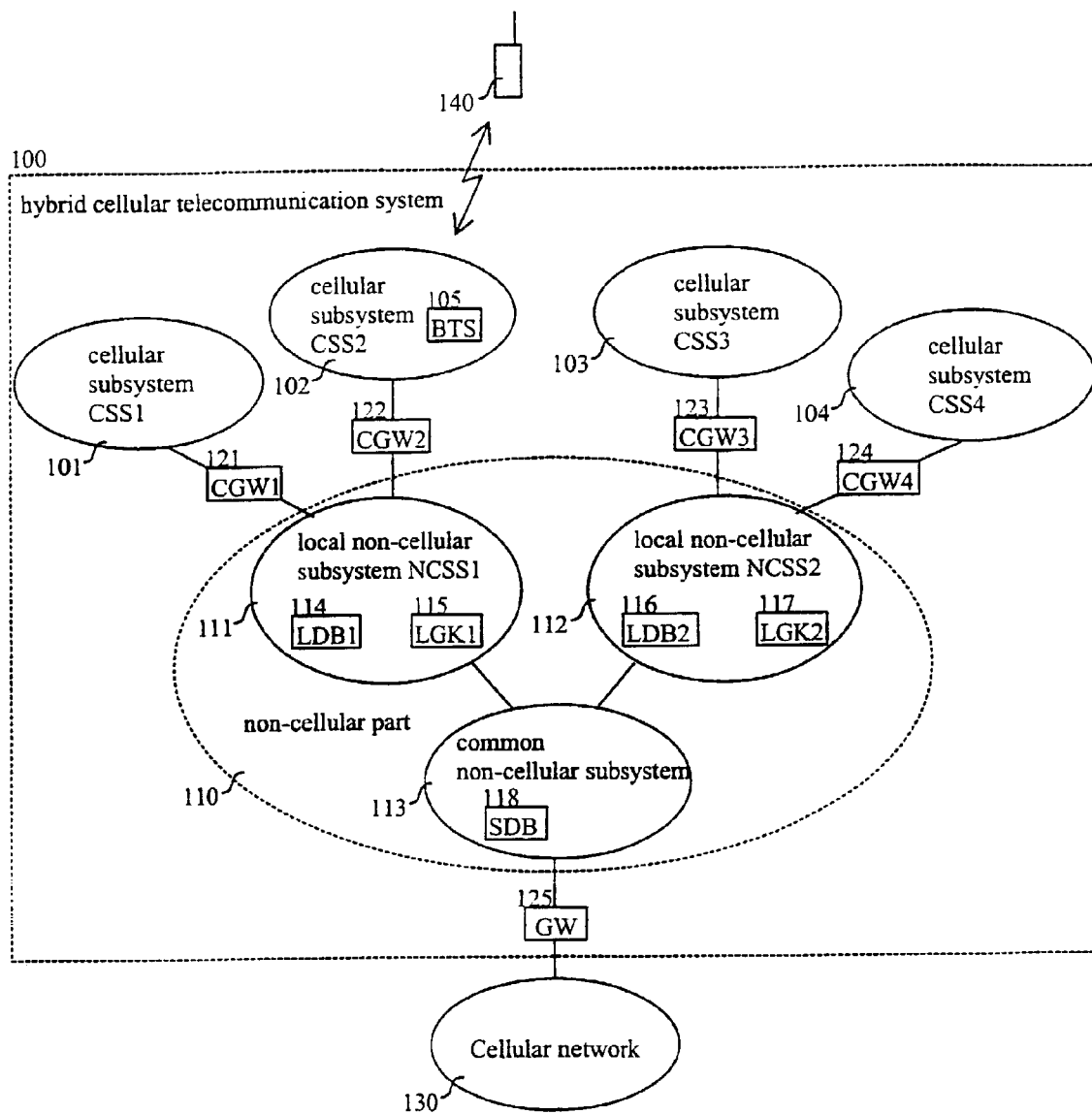
FIG. 1 shows a schematic drawing of a conventional hybrid cellular telecommunication system.
Figure 2:
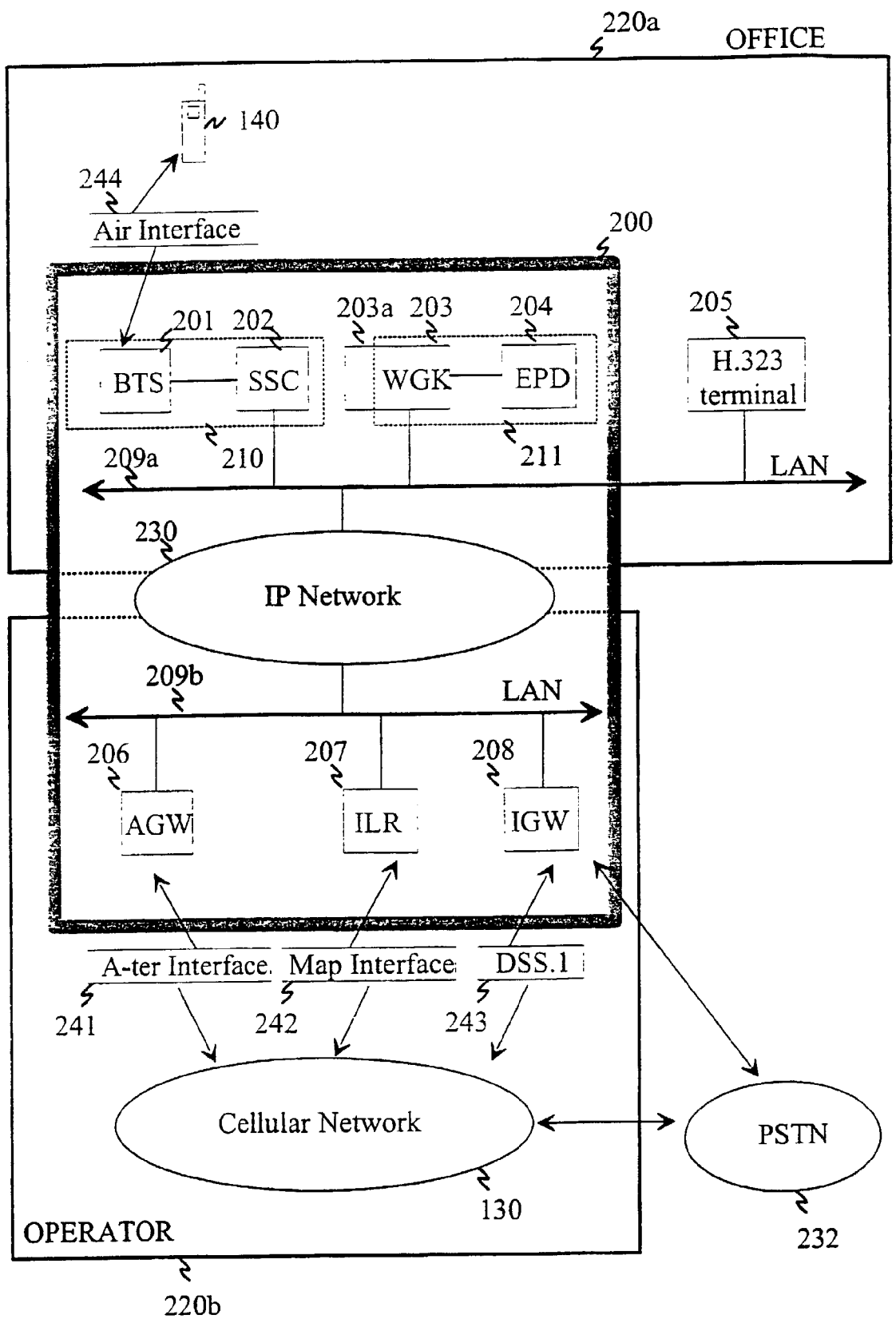
FIG. 2 shows a schematic drawing of a conventional RCP system.

Above in conjunction with the description of the prior art reference was made to FIGS. 1 and 2.

Figure 3:
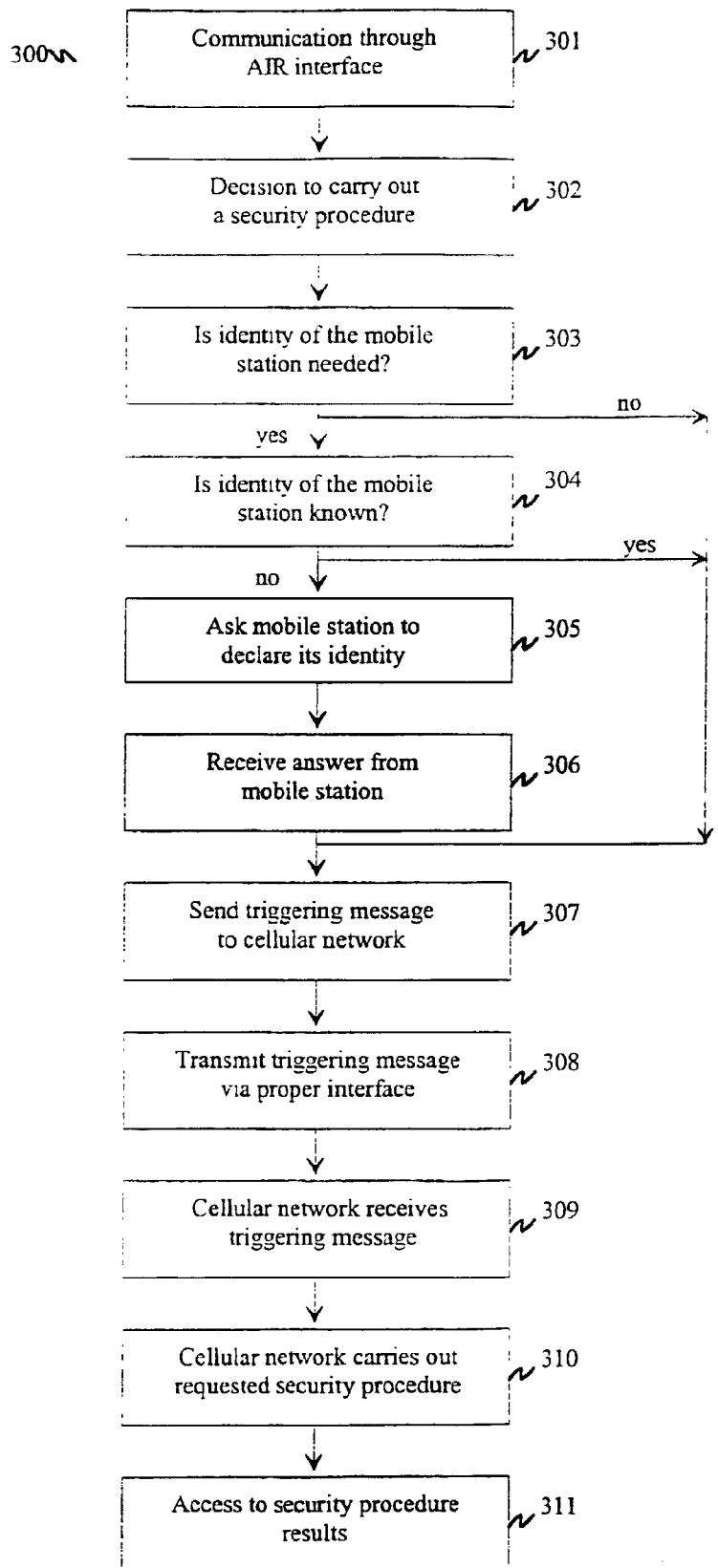
FIG. 3 shows a flow chart of a first preferred embodiment of the method according to the invention.

FIG. 3 shows a flow chart of a first preferred embodiment of the invention. In method 300 the hybrid cellular telecommunication system decides to carry out a security procedure with a mobile station. The cellular network actually runs the security procedure.

In step 301 normal communications between mobile station and the telecommunication system are carried out. The communications are typically handled between a mobile station and a BTS belonging to the hybrid cellular telecommunication system through a standard air interface. Usually the communications in step 301 are communications related to call initialisation, but any other type of communications can also be used.

In step 302 a decision is made to carry out a security procedure with the mobile station. This decision can be based on various parameters. To carry out security procedures can, for example, be an automatic decision in connection with every call initialisation procedure, or it can be done periodically at regular intervals. Especially after a handover from a normal cellular network to the hybrdi cellular telecommunication system there may be need for authentication. The decision can be made by the hybrid cellular telecommuncation system or by the mobile station itself.

In step 303 the hybrid cellular telecommunication system decides if it is necessary for carrying out the security procedure to know to cellular network related identity of the mobile station. This decision depends on which security procedure is being carried out and also on how the procedure is implemented in the cellular network. For example, it is possible to generate encryption keys without knowing the identity of the other party, just the address of the other party is enough. In this case, the identities have to be authenticated in a later stage. It is possible that, for example, the fact that the hybrid cellular telecommunication system knows the H.323 name of the mobile station is sufficient to carry out some security procedures with the cellular network.

If it is necessary to know the identity of the mobile station, in step 304 the hybrid cellular telecommunication system checks if it already knows the identity. If it does not know it, it asks the mobile station to identify itself in step 305. Thereafter it waits for the mobile station to answer (step 306). If the mobile station refuses to send an answer, communications between it and the hybrid cellular telecommunication system can be terminated. In step 307 hybrid cellular telecommunication system sends a triggering request to the cellular network. This triggering request indicates which security procedure is needed and possibly the identity of the mobile station involved in the procedure. The requested security procedure can be indicated, for example, by a proper parameter value in the message. From step 303, if the identity of the mobile station is not needed, or from step 304, if the identity is already known, there is a transition in the flow chart to step 307.

The triggering message is transmitted to the cellular network though a proper interface in step 308. Thereafter the cellular network receives the triggering message (step 309) and carries out the requested security procedure with the mobile station (step 310). After the security procedure has been run, the results of the procedure are available to the hybrid cellular telecommunication system in step 311. The results can be, for example, confirmation of a successful authentication or a new encryption key.

The RCP system employing GSM and H.323 standards is used as an example of a hybrid cellular telecommunication network and the GSM network is used as on example of a cellular system when describing the third preferred embodiment of the invention. These examples are chosen to make the description of the preferred embodiment more tangible; they do not restrict the scope of the invention in any sense.

Figure 4:
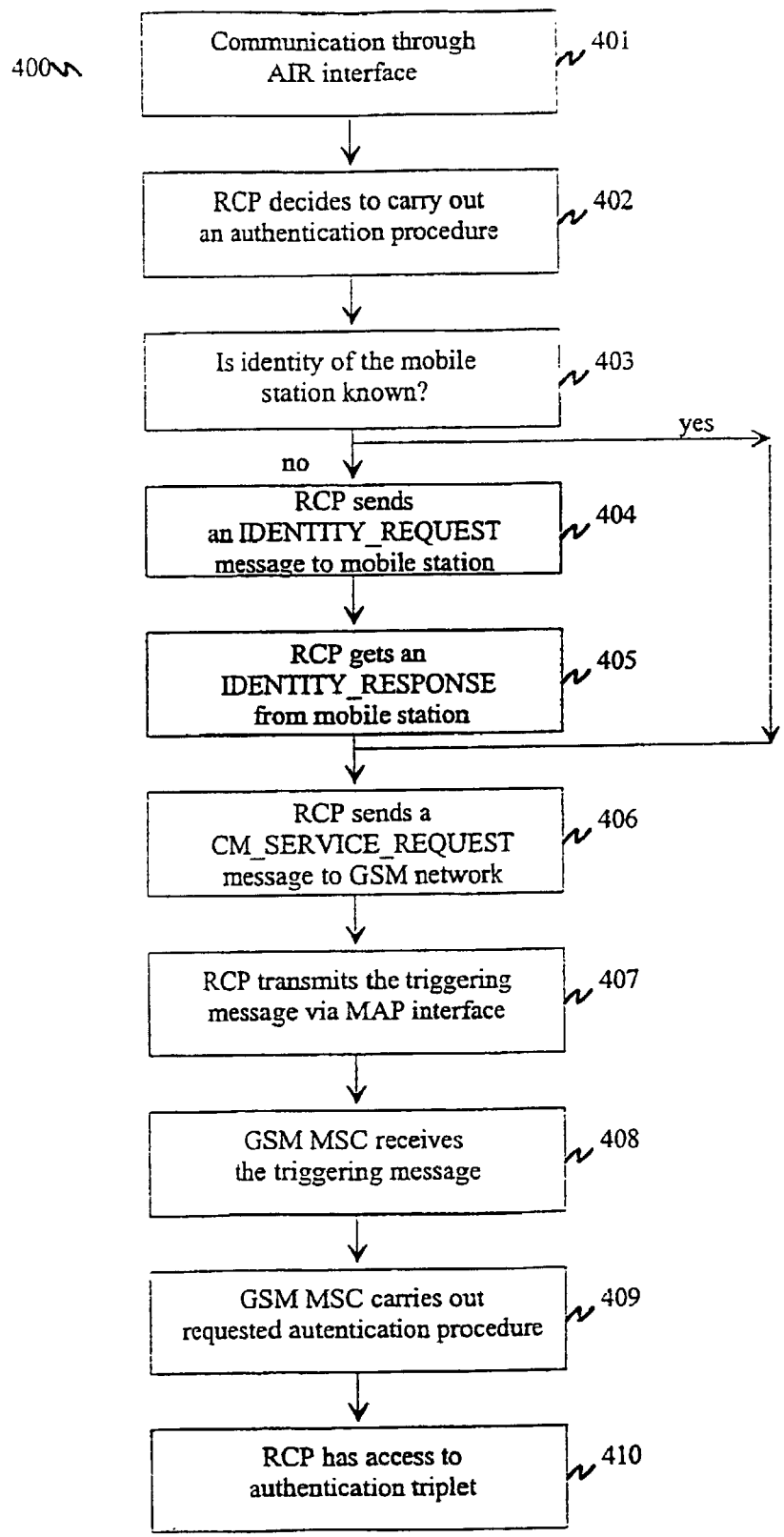
FIG. 4 shows a flow chart of the second preferred embodiment of the method according to the invention and FIG. 5 shows schematic drawings of elements and arrangements according the present invention.

FIG. 4 shows a flow chart of a second preferred embodiment of the invention. The method 400 illustrated in FIG. 4 can be used in RCP system for authenticating a mobile station and generating a new encryption key. In a GSM network the same procedure is responsible for both of these functions.

In step 401 normal communications between mobile station and a RCP system are carried out. The communications are typically handled between a mobile station and a BTS through a standard air interface. Usually the communications in step 401 are communications related to call initialisation, but any other type of communications can also be used.

In step 402 the RCP system makes a decision to authenticate a mobile station or to generate a new encryption key. In step 403 the RCP system checks, if it knows the identity of the mobile station, which is actually the identity of the mobile subscriber. In practice this means either the Temporary Mobile Subscriber Identifier (TMSI) or the Internation Mobile Subscriber Identifier (IMSI) code of the GSM subscriber. To carry out GSM security procedures that employ conventional secret key cryptography, it is necessary to know either the TMSI of the IMSI related to the mobile station.

If the RCP system does not know the identity of the mobile station, it has to ask it first (step 404 in FIG. 4). This can be done, for example, with an IDENTITY_REQUEST message as suggested in FIG. 4. This message is usually sent in GSM network by the MSC after an authentication of a mobile station has failed. One reason for the failure is that the TMSI code the MSC has used to obtain authentication from VLR has not been correct, and the MSC asks the mobile station to give its IMSI code. This is needed to fetch correct authentication information from the HLR. The mobile station answers the identity request, for example, with an IDENTITY_RESPONSE message (step 405 in FIG. 4).

Once the identity of the mobile station, or actually the identity of the mobile subscriber, is known, the RCP system sends a triggering message to the cellular network in step 406. This message is communicated to the GSM network through a proper interface in step 407. If the MSC is in charge of authenticating the mobile stations, the authentication request is sent via the MAP interface. The triggering message can be, for example, a mobility management message. Specifically, it can be a CM_SERVICE_REQUEST message, which is normally sent by the mobile station to the cellular network. A new value, whose name is for example "Authentication needed", may be assigned to a parameter in the sent mobility management message. In the CM_SERVICE_REQUEST message this parameter could be, for example, the CM_SERVICE_TYPE parameter. The CM_SERVICE_REQUEST is transmitted through the MAP interface to the MSC.

In the cellular network side the part that carries out the authentication has to understand the meaning of the new parameter. If only an extra parameter value is added to a message specification, the format of the message does not change. Therefore the network elements relaying the message should not require any modifications.

The CM_SERVICE_REQUEST message contains an identity code of a mobile phone. This message is usually sent by a mobile phone itself, and in those cases it can fill in the necessary identity information. When the RCP system triggers the authentication procedures of the cellular network with this message, it has to fill in the identity code of the mobile station.

In step 408 the cellular network receives the authentication request, and in step 409 it carries out the authentication. In a GSM network it is usually the MSC that is involved in the authentication of a mobile station, and it asks the HLR to send an authentication triplet. This authentication triplet contains a random number RAND that the HLR used together with the mobile subscriber secret key Ki to calculate the authentication response SRES and a new encryption key Kc. During the authentication procedure the mobile station also calculates SRES which it sends to the MSC for verification.

In step 410 the RCP system has access to the result of the authentication. The new authentication triplet is fetched from the GSM network to the ILR. As a part of the GSM authentication procedure, the mobile station generates the key Kc, and with known GSM procedures the BTS and mobile station take the new key into use in a synchronized way after the step 410 has been finished.

Figure 5:
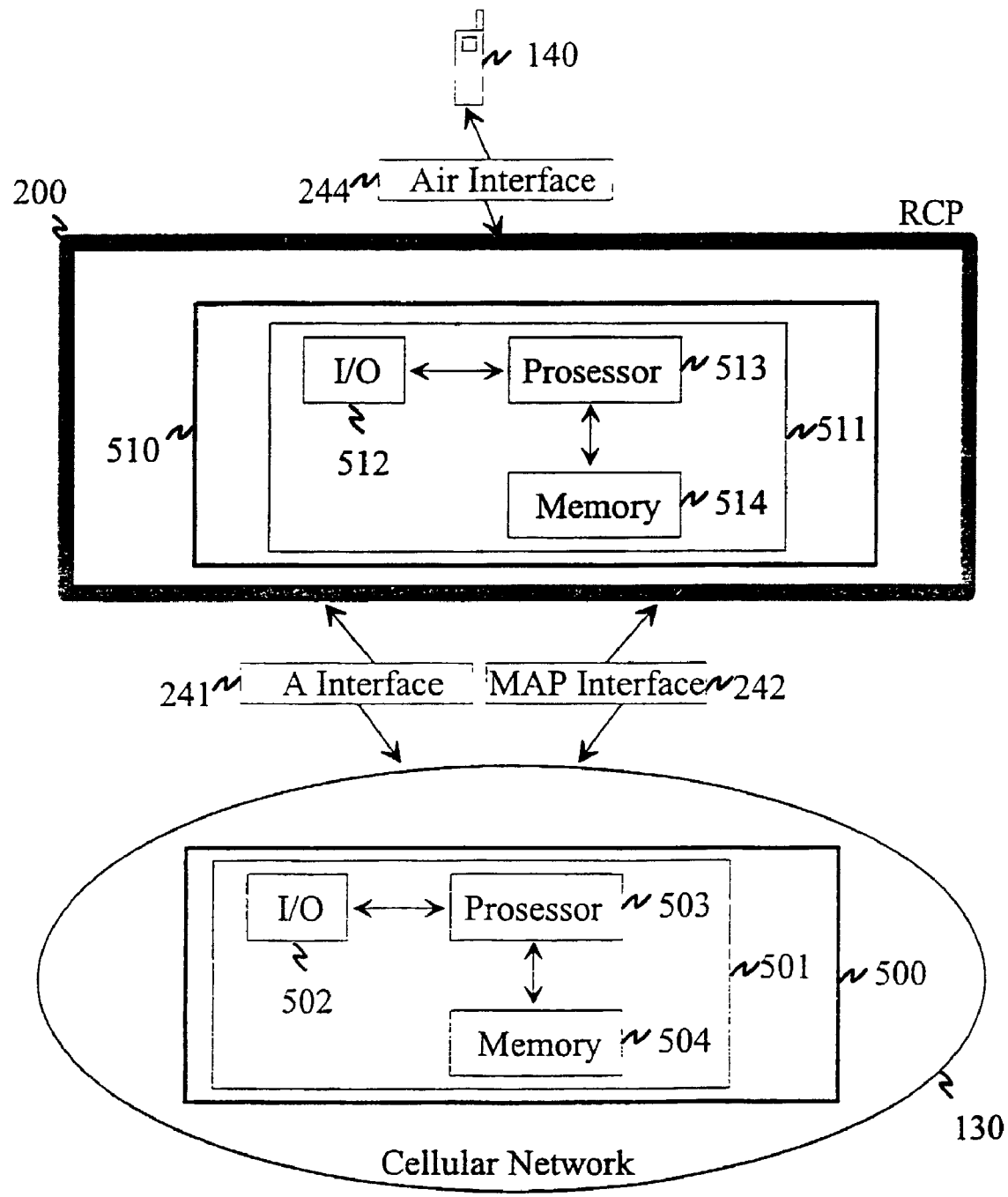

FIG. 5 shows a schematic drawing of a RCP system 200 with a network element 510 comprising a system 511 for triggering the security procedures related to the mobile station 140 according to the present invention. For example, the gatekeeper 203 can comprise the system 511 for triggering the security procedures. The system 511 can also be implemented, for example, in SSC or BTS.

FIG. 5 shows also a cellular telecommunication network 130 with a network element 500 comprising a system 501 for carrying out the security procedures according to the present invention. The network element 500 can be, for example, a mobile switching center within the cellular network. The standard GSM interfaces 241, 242 and 244 through which the communications is handled from the RCP system 200 to the mobile station 140 and to the cellular network 130 are also shown in FIG. 5.

In the FIG. 5, the system 511 in RCP network element 510 has a I/O port 512 for communicating with other parts of the RCP system 200, for example using the LAN 109a shown in FIG. 1. A processor 513 utilising a program saved in the memory 514 is used to control the security procedure requests. The request can be sent, for example, every time a call is initialised or be periodically at regular intervals.

When it is desired that a security procedure is needed the processor 513 controlled by the program stored in memory 514 sends a security procedure triggering signal into the RCP system 200 using the I/O port 512. In the fourth preferred embodiment of the invention this triggering signal is a normal mobility management message whose certain parameter has been given a new value. The triggering signal is handled using known methods and means via the appropriate interface 241, 242 to the cellular telecommunication network 130.

In the cellular network 130 the triggering signal is preferably received by an element which controls the security procedures. In GSM systems this element is usually MSC. The element 500 comprises a system 501 for initialising the security procedures. The triggering signal is received by the I/O port 502 and detected by the processor 503 that is controlled by a program stored in the memory 504. When a triggering signal is detected, the normal security procedure, which is stated in the triggering signal, is initialised and carried out by the network element 500 controlling the security procedure using means and methods known per se.

The name of a given functional entity, such as the base station controller, is often different in the context of different telecommunication systems. For example, in the Universal Mobile Telecommunication System (UMTS) the functional entity corresponding to a base station controller (BSC) is the radio network controller (RNC). Therefore, the particular terminology used to denote various functional entities in this specification are only examples according to the GSM and RCP systems, and do not limit the methods or network elements according to the invention in any way.

Especially the UMTS and UMTS network elements may be used in future hybrid cellular telecommunication systems, and methods and network elements according to the invention may be implemented using UMTS and UMTS network elements.

The combination of the H.323 standard and IP networks has been used as an example of non-cellular telephony network. They do not either limit the methods and techniques that can be used in the non-cellular part of the hybrid cellular telecommunication system. Consequently, the methods and network elements according to the invention are not limited to such methods or network elements that employ the H.323 stardard or IP techniques.

A hybrid cellular telecommunication system has been presented here as an example of a telecommunication system that combines cellular network techniques and techniques that are neither cellular nor traditional fixed telephony techniques. The division of such a telecommunication system to the cellular and non-cellular subsystems have been used here to explain the system in a more tangible way. It is not limit the systems where the methods and network elements according to the invention are used to such systems that have all the distinct subsystems described here.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the scope of the invention as defined by the appended claims.

What is claimed is:

1. A method for externally triggering a security procedure for performance by a cellular network, where a hybrid cellular telecommunication system communicates with a mobile station and the hybrid cellular telecommunication system communicates with the cellular network, the method comprising:

sending a security procedure triggering message to the cellular network, after a decision to trigger the security procedure of the cellular network is made by an external element functionally connected to the cellular network;

wherein the hybrid cellular telecommunication system lacks the capacity to perform the security procedure for any mobile station, data related to the security procedure is transferred between the cellular network and the mobile station in both directions via the hybrid cellular telecommunication system, and the mobile station, the hybrid cellular telecommunication system and the cellular network are separate entities.

2. The method of claim 1, further comprising the step of:

making the decision to trigger the security procedure in the hybrid cellular telecommunication system;

wherein the security procedure of the cellular network is triggered by the hybrid cellular telecommunication system.

3. The method of claim 2, wherein the security procedure is triggered by a gateway element which connects a cellular subsystem to the hybrid cellular telecommunication system.

4. The method of claim 2, wherein the security procedure is triggered by a gatekeeper within the hybrid cellular telecommunication system.

5. The method of claim 2, wherein the security procedure is triggered by a base transceiver station within the hybrid cellular telecommunication system.

6. The method of claim 2, wherein the identity of the mobile station is requested by the hybrid cellular telecommunication system.

7. The method of claim 1, wherein the decision to trigger the security procedure is made by said mobile station and the security procedures of the cellular network are triggered by said mobile station.

8. The method of claim 1, wherein the security procedure is triggered by sending a triggering message to the cellular network via an interface.

9. The method of claim 8, wherein the security procedure is triggered by sending a mobility management message having an indication of a requested security procedure.

10. The method of claim 1, wherein part of a non-cellular subsystem an the hybrid cellular telecommunication system is realized using an Internet Protocol network and the H.323 standard.

11. An element of a hybrid cellular telecommunication system functionally connected to a cellular network, said system having means for communicating with a mobile station and means for communicating with a cellular network in both directions, the element comprising:

an arrangement having means for making a decision to trigger a security procedure and for creating and sending a security procedure triggering message to the cellular network, and the mobile station, wherein the hybrid cellular telecommunication system lacks the capacity to perform the security procedure for any mobile station and the hybrid cellular telecommunication system and the cellular network are separate entities.

12. A method for carrying out a security procedure with a mobile station, where a hybrid cellular telecommunication system communicates with a cellular network, the method comprising:

receiving, in the cellular network, a security procedure triggering message based on a decision to trigger a security procedure of the cellular network by an external element functionally connected to the cellular network; and carrying out the security procedure with the mobile station by the cellular network;

wherein the hybrid cellular telecommunication system lacks the capacity to perform the security procedure for any mobile station, data related to the security procedure is transferred between the cellular network and the mobile station in both directions via the hybrid cellular telecommunication system, and the mobile station, the hybrid cellular telecommunication system and the cellular network are separate entities.

13. The method of claim 12, wherein the decision to trigger the security procedure is made by said mobile station and the security procedures of the cellular network are triggered by said mobile station.

14. The method of claim 12, wherein the security procedure is triggered by sending a triggering message to the cellular network via an interface.

15. The method of claim 12, wherein part of the non-cellular subsystem of the hybrid cellular telecommunication system is realized using an Internet Protocol network and H.323 standard.

16. The element of claim 11, wherein said triggering message is a mobility management message having an indication of a requested security procedure.

17. The element of claim 11, wherein the element is a base transceiver station.

18. The element of claim 11, wherein the element is a gateway which connects a cellular subsystem to the hybrid cellular telecommunication system.

19. The element of claim 11, wherein the element is a gatekeeper.

20. The element of claim 11, wherein said cellular network is a GSM network and at least part of a non-cellular subsystem of the hybrid cellular telecommunication system is a packet based network.

21. The element of claim 11, wherein said cellular network is an UMTS network and at least part of a non-cellular subsystem of the hybrid cellular telecommunication system is a packet based network.

22. An element of a cellular network having means for carrying out a security procedure with a separate mobile station wherein the element further comprises means for receiving a security procedure triggering message by an external element functionally connected to the cellular network and wherein the element is arranged to carry out a security procedure when detecting the security procedure triggering message, and wherein a hybrid cellular telecommunication system is functionally connected to the cellular network, the hybrid cellular telecommunication system lacks the capacity to perform the security procedure for any mobile station, data related to the security procedure is transferred between the cellular network and the mobile station in both directions via the hybrid cellular telecommunications system, and the mobile station, hybrid cellular telecommunication system, and cellular network are separate entities.

23. The element of claim 22, wherein said element includes means for initializing the security procedure according to the received triggering message.

24. The element of claim 22, wherein said triggering message is a mobility management message where a pre-determined parameter value is allocated for indicating the requested security procedure.

25. The element of claim 22, wherein said element is a mobile switching center.

26. The element of claim 22, wherein said element is an element of a GSM network.

27. The element of claim 22, wherein said element is an element of a UMTS network.

28. An apparatus configured for carrying out a security procedure with a mobile station, where a hybrid cellular telecommunication system communicates with the mobile station and a cellular network, comprising:

means for receiving a security procedure triggering message based on a decision to trigger a security procedure of the cellular network by an external element functionally connected to the cellular network; and means for carrying out the security procedure with the mobile station by the cellular network;

wherein the hybrid cellular telecommunication system lacks the capacity to perform the security procedure for any mobile station, data related to the security procedure is transferred between the cellular network and the mobile station in both directions via the hybrid cellular telecommunication system, and the mobile station, the hybrid cellular telecommunication and the cellular network are separate entities.

29. The apparatus of claim 28, wherein the apparatus is a wireless device.

30. A system for externally triggering a security procedure for performance by a cellular network, where a hybrid cellular telecommunication system communicates with a mobile station and the hybrid cellular telecommunication system communicates with a cellular network, comprising:

means for sending a security procedure triggering message to the cellular network, after a decision to trigger the security procedure of the cellular network is made by an external element functionally connected to the cellular network; and means for transferring data related to the security procedure between the cellular network and the mobile station in both directions via the hybrid cellular telecommunication system;

wherein the hybrid cellular telecommunication system lacks the capacity to perform the security procedure for any mobile station and the mobile station, the hybrid cellular telecommunication system and the cellular network are separate entities.

31. A computer-readable medium encoded with a computer program executed by a computer that causes a system to externally trigger a security procedure for performance by a separate cellular network, comprising:

program code for sending a security procedure triggering message to the cellular network, after a decision to trigger the security procedure of the cellular network is made by an external element functionally connected to the cellular network; and program code for transferring data related to the security procedure between the cellular network and the mobile station in both directions via the hybrid cellular telecommunication system;

wherein the hybrid cellular telecommunication system lacks the capacity to perform the security procedure for any mobile station and the mobile station, the hybrid cellular telecommunication system and the cellular network are separate entities.

32. An element of a hybrid cellular telecommunication system functionally connected to a separate cellular network, said system configured to communicate with a mobile station and configured to communicate with a cellular network, the element configured to:

trigger a security procedure of the cellular network by sending a security procedure triggering message to the separate cellular network, wherein the hybrid cellular telecommunication system lacks the capacity to perform the security procedure for any mobile station, and wherein data related to the security procedure is transferred between the cellular network and the mobile station in both directions via the hybrid cellular telecommunications system.

33. The element of claim 32, wherein the element is a gateway which connects a cellular subsystem to the hybrid cellular telecommunication system.

* * * * *

UNITED STATES PATENT AND TRADEMARK OFFICE
CERTIFICATE OF CORRECTION

PATENT NO. : 7,590,407 B1 Page 1 of 1
APPLICATION NO. : 10/130406
DATED : September 15, 2009
INVENTOR(S) : Honkala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twenty-first Day of September, 2010

David J. Kappos
*Director of the United States Patent and Trademark Office*